United States Patent
Oroskar et al.

(10) Patent No.: US 8,964,736 B1
(45) Date of Patent: Feb. 24, 2015

(54) RTP STREAMING WITH DYNAMIC PACKET FORMAT MODIFICATION

(71) Applicant: Sprint Communications Company L.P., Overland Park, KS (US)

(72) Inventors: Siddharth Oroskar, Overland Park, KS (US); Pierce Andrew Gorman, Lee's Summit, MO (US); Gerald Baylis Prince Young, Olathe, KS (US); David M. Lee-Chin, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 254 days.

(21) Appl. No.: 13/686,259

(22) Filed: Nov. 27, 2012

(51) Int. Cl.
  *H04L 12/28* (2006.01)
  *H04L 12/54* (2013.01)
(52) U.S. Cl.
  CPC ............................... *H04L 12/5689* (2013.01)
  USPC ........................... 370/389; 370/349; 370/352
(58) Field of Classification Search
  CPC ............. H04L 12/5689; H04L 65/102; H04L 29/06176
  USPC .......... 370/389, 352, 353, 354, 358, 356, 357
  See application file for complete search history.

(56) References Cited

U.S. PATENT DOCUMENTS

| | | | |
|---|---|---|---|
| 6,404,746 B1 * | 6/2002 | Cave et al. | 370/262 |
| 8,214,520 B1 * | 7/2012 | Bertz et al. | 709/231 |
| 2004/0165527 A1 | 8/2004 | Gu et al. | |
| 2004/0240390 A1 | 12/2004 | Seckin | |
| 2005/0047340 A1 * | 3/2005 | Babiarz et al. | 370/231 |
| 2005/0190756 A1 | 9/2005 | Mundra et al. | |
| 2010/0138531 A1 * | 6/2010 | Kashyap | 709/224 |

* cited by examiner

*Primary Examiner* — Brenda Pham

(57) ABSTRACT

Systems, methods, and software are described herein for operating a RTP server including receiving a session request from a user communication device indicating the user communication device has packet format switching capability, transferring an acknowledgement to the user communication device wherein the acknowledgement comprises at least a header-free packet string length, transferring a RTP stream using bundled packet format, transferring a packet format switch triggering event, and transferring the RTP stream using header-free packet format for at least as long as the header-free packet string length.

20 Claims, 6 Drawing Sheets

RTP STREAMING WITH DYNAMIC PACKET FORMAT MODIFICATION

TECHNICAL BACKGROUND

Real-time protocol (RTP) is a standardized packet format for delivering audio and video over IP networks. RTP is used in communication and entertainment systems that involve streaming media, such as telephony, videoconference applications, television services, and web-based push-to-talk-applications. Currently, two prevalent RTP packet formats are Interleaved/Bundled Packet Format (Bundled Packet Format) and Header-Free Packet Format.

Interleaved/Bundled Packet Format allows multiple data frames to be included by interleaving or bundling these frames together. Furthermore, Interleaved/Bundled Packet Format adds error correction information to a media stream, gaining protection from packet loss at the expense of increased bandwidth. Alternatively, a system may employ Header-Free Packet Format. Header-Free Packet Format is designed for maximum bandwidth efficiency and low latency.

An RTP coding scheme that uses EVRC-NW does allow mid-call changes to the Capacity Operating Point (COP) which affects coding and bandwidth. The EVRC-NW scheme does not support the transition between the Interleaved/Bundled Packet Format and the Header-Free Packet Format. Current RTP technology does not effectively support mid-call changes between the Interleaved/Bundled Packet Format and the Header-Free Packet Format.

Overview

Embodiments disclosed herein provide systems and methods for RTP streaming. In a particular embodiment, a method of operating a RTP server includes receiving a session request transferred by a user communication device indicating the user communication device has packet format switching capability, in response to the session request, transferring an acknowledgement to the user communication device wherein the acknowledgement comprises at least a header-free packet string length, transferring an RTP stream using bundled packet format, detecting a packet format switch triggering event, and transferring the RTP stream using header-free packet format for at least as long as the header-free packet string length.

In an another embodiment, a computer readable medium having program instructions stored thereon that, when executed by a computing system, directs the computing system to receive a session request from a user communication device indicating the user communication device has packet format switching capability, transfer an acknowledgement to the user communication device wherein the acknowledgement comprises at least a header-free packet string length, transfer a RTP stream using bundled packet format, transfer a packet format switch triggering event, and, upon transferring the packet format switch triggering event, transfer the RTP stream using header-free packet format for at least as long as the header-free packet string length.

In another embodiment, a RTP server system includes a communication interface configured to receive a session request from a user communication device, and a processing system configured to determine whether the session request indicates that the user communication device has packet format switching capability. If the user communication device has packet format switching capability, the communication interface is further configured to transfer an acknowledgement to the user communication device wherein the acknowledgement comprises at least a header-free packet string length, transfer a RTP stream using bundled packet format, transfer a packet format switch triggering event, and upon transferring the packet format switch triggering event, transferring the RTP stream using header-free packet format for at least as long as the header-free packet string length.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
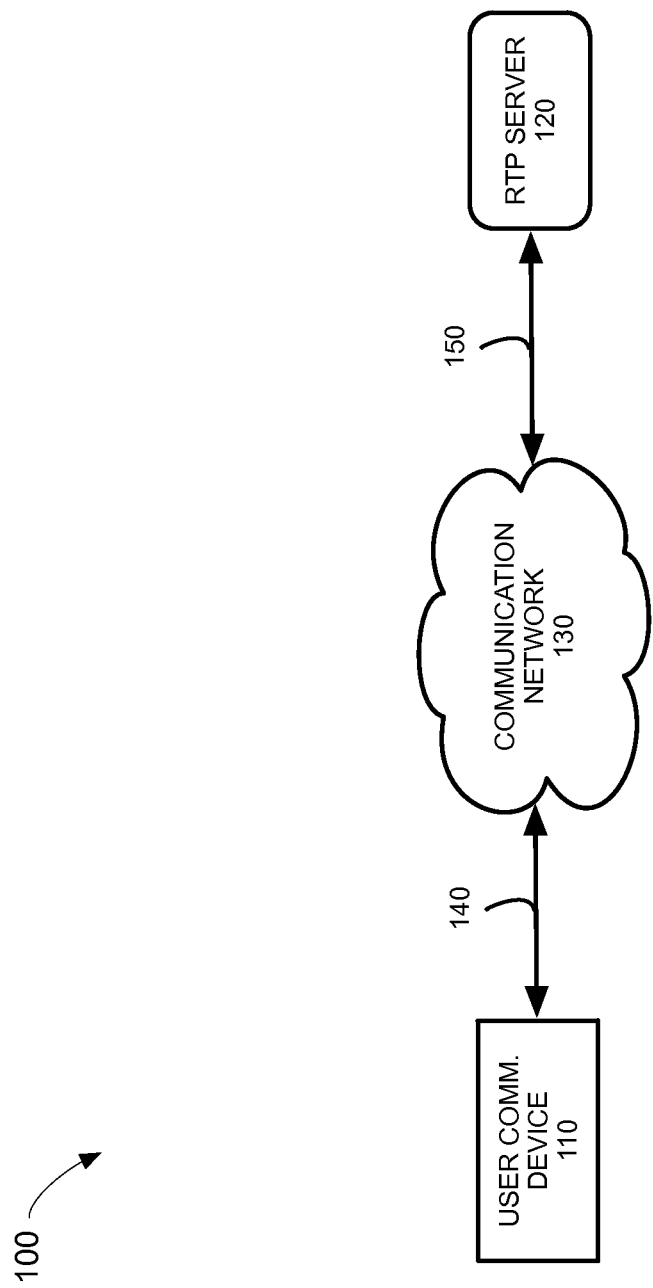
FIG. 1 illustrates a communication system for RTP streaming.

FIG. 1 illustrates a communication system 100. Communication system 100 includes user communication device 110, RTP server 120, and communication network 130. User communication device 110 communicates with communication network 130 using wired or wireless communication link 140. RTP server 120 communicates with communication network 130 using communication link 150.

User communication device 110 can include cellular phones, tablets, laptop computers, desktop computers, or any other like device capable of communicating an RTP Stream over communication link 140. RTP server 120 can include one or more computer systems, custom hardware, or other devices configured to transmit an RTP stream. RTP server 120 may include server computers, desktop computers, or any other like device capable of transmitting an RTP stream over communication link 150.

Communication link 140 can include wireless communication links such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication link. Communication link 140 can also include wired communication links such as Internet, Ethernet, or any other form of wired communication link.

Communication link 150 is representative and may include intermediate links, networks, and systems, such as the Internet.

Communication Network 130 comprises network elements that provide communications services between user communication device 110 and RTP server 130. Communication network 130 may comprise switches, wireless access nodes, Internet routers, network gateways, application servers, computer systems, communication links, or some other type of communication equipment—including combinations thereof.

Figure 2:
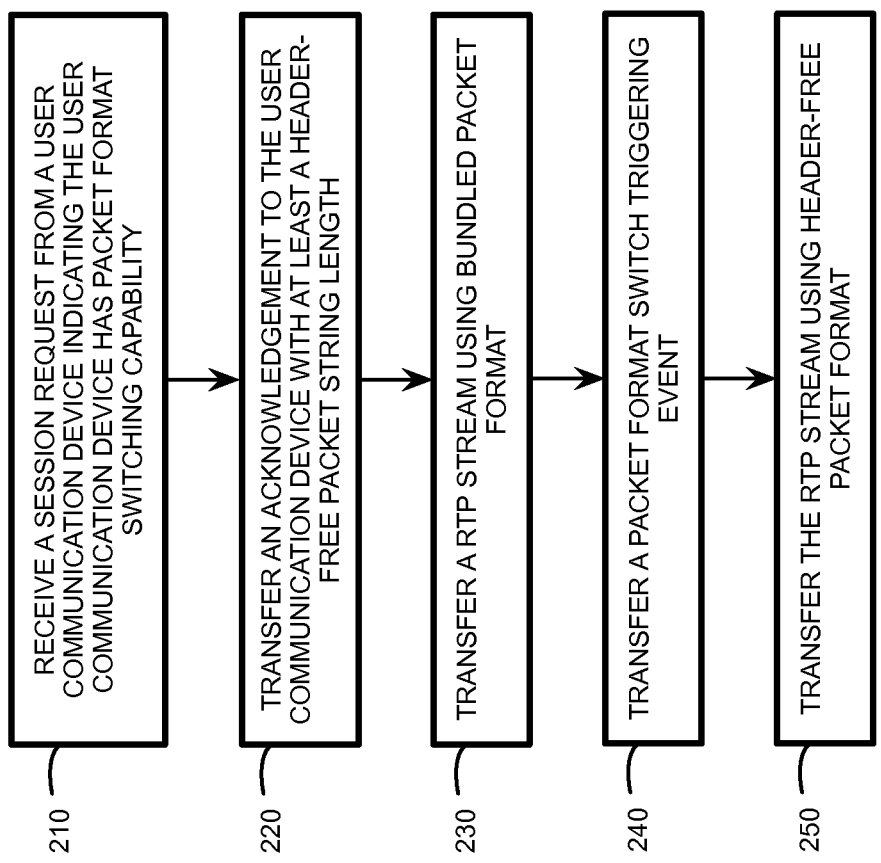
FIG. 2 illustrates the operation of a communication system for RTP streaming.

FIG. 2 illustrates the operation of communication system 100 for RTP streaming. In operation, RTP server 120 receives a session request from user communication device 110 indicating user communication device 110 has packet format switching capability (step 210). In response to this request, RTP server 120 transfers an acknowledgment to user communication device 110 containing at least a header-free packet string length (step 220). The header-free packet string length indicates the number of Header-Free Packet Format packets to be transmitted between Interleaved/Bundled Packet Format (hereinafter "Bundled Packet Format") packets. For example, an RTP transmission can start in Bundled Packet Format and then switch to Header-Free Packet Format. The header-free packet string length will indicate the number of header-free packets to transmit before returning to Bundled Packet Format.

After negotiating the parameters for the transmission, including the header-free packet string length, RTP server 120 begins transferring a RTP stream using Bundled Packet Format (step 230). The stream will continue in Bundled Packet Format until the detection of a packet format switch triggering event, which indicates to user communication device 110 that the packet format is being switched to Header-Free Packet Format (step 240).

In at least one example, the Bundled Packet Format packets can include an indicator bit to indicate when to begin streaming in Header-Free Packet Format. Such an indicator bit could be used as a packet format switch triggering event. For example, while transmitting in Bundled Packet Format, the indicator bit can be set to 0 or low to indicate that the packets will continue to be streamed in Bundled Packet Format. When the indicator bit is set to 1 or high, user communication device 110 can then expect the next packet to be in the Header-Free Packet Format.

Once a packet format switch triggering event is detected, RTP server 120 then transmits using Header-Free Packet Format (step 250). In at least one example, the Header-Free Packet Format will continue as long as the header-free packet string length. Once the string length concludes, RTP server 120 can then resume streaming using Bundled Packet Format.

In another example, once the stream is in Header-Free Packet Format, the stream will continue in Header-Free Packet Format until the end of the stream.

The switching between Bundled Packet Format and Header-Free Packet Format can be determined on a multitude of factors. Such factors may include the type of data streamed, constraints on the network, or any other relevant factor in determining an appropriate RTP packet format. For example, applications that require error-free support, such as voice applications, should attempt to use Bundled Packet Format to prevent loss. However, other applications, where loss may not be as relevant, the server could use either Bundled Packet Format or Header-Free Packet Format.

Figure 3:
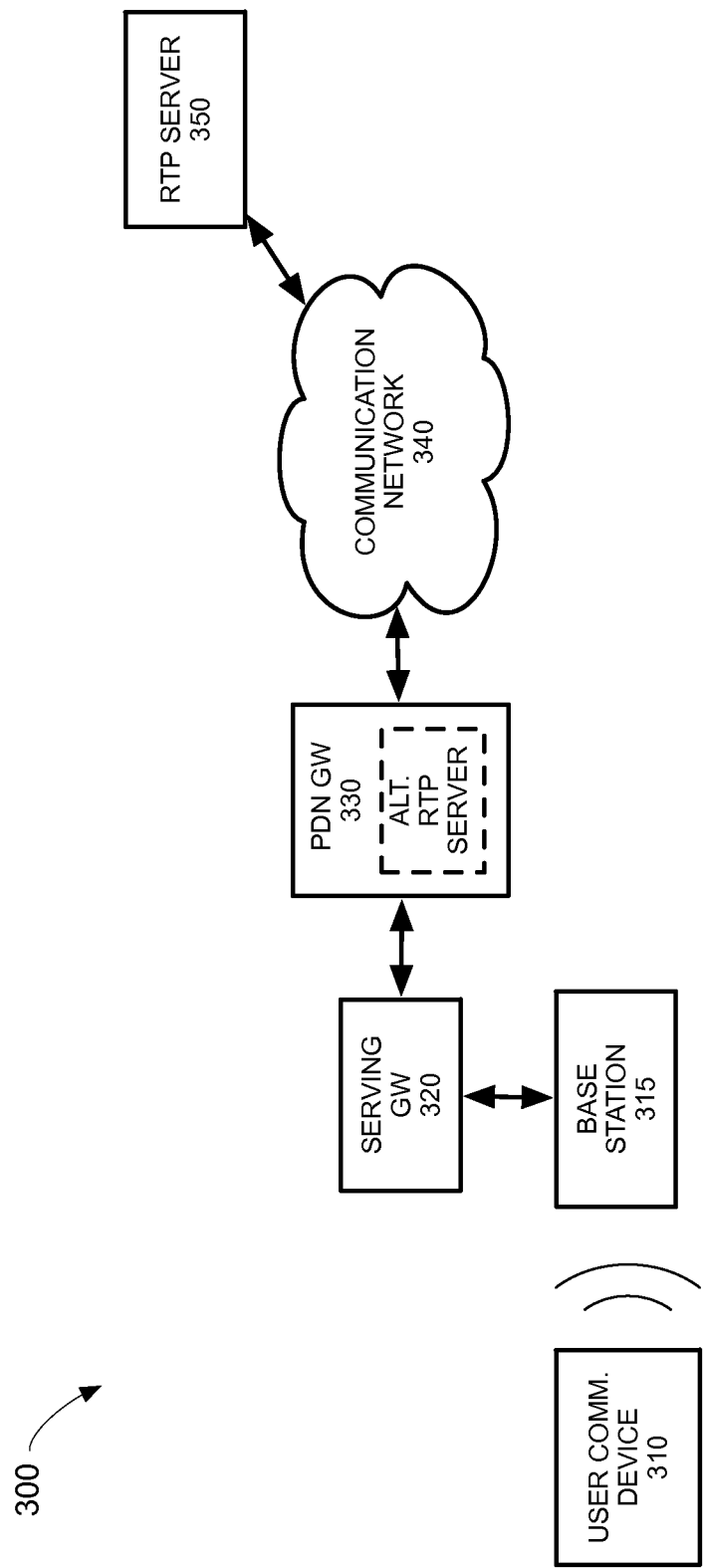
FIG. 3 illustrates a communication system for RTP streaming.

FIG. 3 illustrates a communication system 300 for RTP streaming. Communication system 300 includes user communication device 310, serving gateway 320, packet data network (PDN) gateway 330, communication network 340, and RTP server 350. In some examples, packet data network gateway can also act as an alternative RTP server.

User communication device 310 can be any wireless device including cellular phones, tablets, laptops, computers, or any other like device capable of communicating wirelessly with base station 315. Such wireless communication formats can include Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. User communication device 310 can communicate RTP streams in Interleaved/Bundled Packet Format or Header-Free Packet Format.

RTP server 350 can include one or more computer systems, custom hardware, or other devices configured to transmit an RTP stream using communication network 340. Examples of RTP server 350 can include server computers, desktop computers, or any other system capable of RTP streaming. RTP server 350 can be configured to transmit an RTP stream using Bundled Packet Format or Header-Free Packet Format.

Communication network 340 can include the Internet or any other form of communication network.

Base station 315 can include one or more computer systems, custom hardware, or other devices configured to transmit and receive wireless communication from user device 310. Base station 315 is also configured to communicate with serving gateway 320.

Serving gateway 320 can include one or more computer systems, custom hardware, or other devices capable of routing the incoming and outgoing IP packets for base station 315. PDN gateway 330 can include one or more computer systems, custom hardware, or other devices capable of handling the incoming and outgoing packets for communication network 340. PDN gateway 330 can perform various functions such as IP address or IP prefix allocation, or policy control and charging. In this example, PDN gateway 330 is illustrated separate from serving gateway 320, however, those skilled in the art will appreciate that PDN gateway 330 and serving gateway 320 can be implemented together.

In operation, user communication device 310 will issue a request to begin an RTP session with RTP server 350. After the request is transmitted to RTP server 350, RTP server 350 will transfer an acknowledgment to user communication device 310 with at least a header-free packet string length. A header-free packet string length is the number of packets that will be sent in Header-Free Packet Format between packets in Bundled Packet Format.

After the set up of the transmission, RTP server 350 begins transmitting the RTP stream to user communication device 310 in Bundled Packet Format. RTP server 350 can then transmit the stream using a combination of Bundled Packet Format and Header-Free Packet Format, as further described in FIG. 4.

In at least one example, PDN gateway 330 can act as an alternative RTP server. In this situation, user communication device 310 will request RTP server 350 to begin an RTP stream. Based on this request, RTP server 350 will begin to stream the requested material using Bundled Packet Format or any other known RTP format, however, the stream will not proceed directly to user communication device 310. Instead, PDN gateway 330 will act as an intermediary RTP server. This intermediary server will receive the RTP stream from RTP server 350 then transmit the RTP stream to user device 310 in Bundled Packet Format or Header-Free Packet Format based on network conditions. Such network conditions could include bandwidth requirements, latency requirements or any other requirement optimal transmission to the user communication device.

Figure 4:
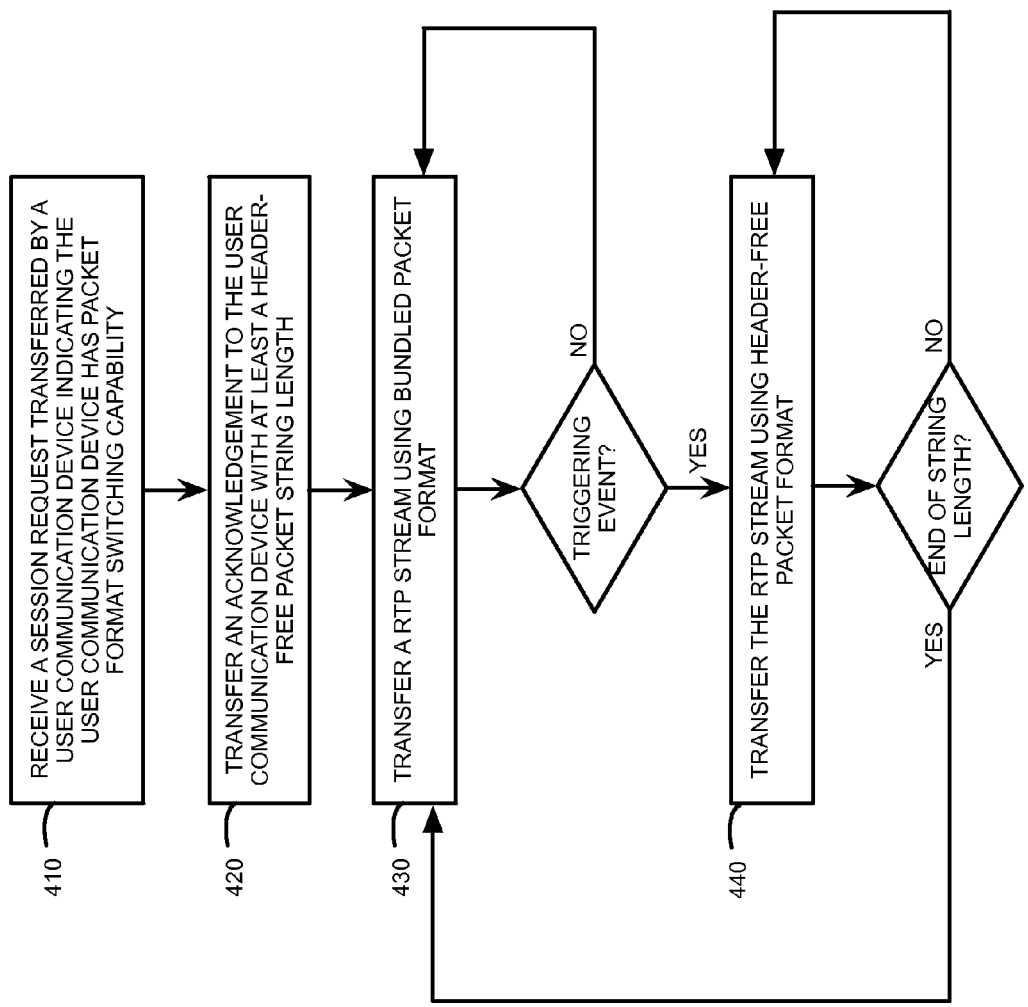
FIG. 4 illustrates the operation of a RTP server for RTP streaming.

FIG. 4 illustrates a method for operating an RTP server. As illustrated in FIG. 4, the method begins by the RTP server receiving a RTP session request from a user communication device, indicating the user communication device has packet format switching capability (step 410). Packet format switching capability, in the present example, is the ability to switch between Bundled Packet Format and Header-Free Packet Format. In response to the RTP session request, the RTP server will transfer an acknowledgement to the user communication device with at least a header-free packet string length (step 420). The header-free packet string length indicates the number of Header-Free Packet Format packets to be transmitted between Bundled Packet Format packets. For example, a RTP transmission can start in Bundled Packet Format then switch to Header-Free Packet Format, the header-free packet string length will indicate the number of Header-Free Packet Format packets to transmit before returning to Bundled Packet Format.

Once the acknowledgment has been transferred from the RTP server to the user communication device, the RTP server will begin transmitting a RTP stream using Bundled Packet Format (step 430). While transmitting in the Bundled Packet Format, the RTP server could monitor for situations in which it would be optimal to transmit in Header-Free Packet Format. Such situations include when the RTP server determines maximum bandwidth efficiency and low latency are optimal for the stream. Thus, to switch the transmission from Bundled Packet Format to Header-Free Packet Format a triggering event could be included in the stream to notify the user communication device of the RTP packet format change.

In at least one example, the Bundled Packet Format can include a Format Switching Bit (FSB). The FSB can be used as an indicator for the user communication device to switch from Bundled Packet Format to Header-Free Packet Format. For example, when the streaming starts in Bundled Packet Format the FSB could be set to 0 or low to indicate that the next packet will also be in Bundled Packet Format. If the FSB is set to 1 or high this could indicate that the next packet will be sent in Header-Free Packet Format. It should be understood that that FSB value can be reversed in some examples such that 1 or low indicates continuing Bundled Packet Format, and 0 or low indicates switching to Header-Free Packet Format.

Upon transmitting the indication of a switch from Bundled Packet Format to Header-Free Packet Format, the RTP server then streams using Header-Free Packet Format (step 440). In at least one example, the RTP server will transmit using Header-Free Packet Format for as long as the header-free packet string length then will return to transmitting Bundled Packet Format. In at least one example, the Header-Free Packet Format can omit the FSB and rely on the header-free string length to indicate when to return to Bundled Packet Format.

The transmission will continue in this process of transmitting using Bundled Packet Format and Header-Free Packet Format until the entire RTP stream has transmitted.

Figure 5:
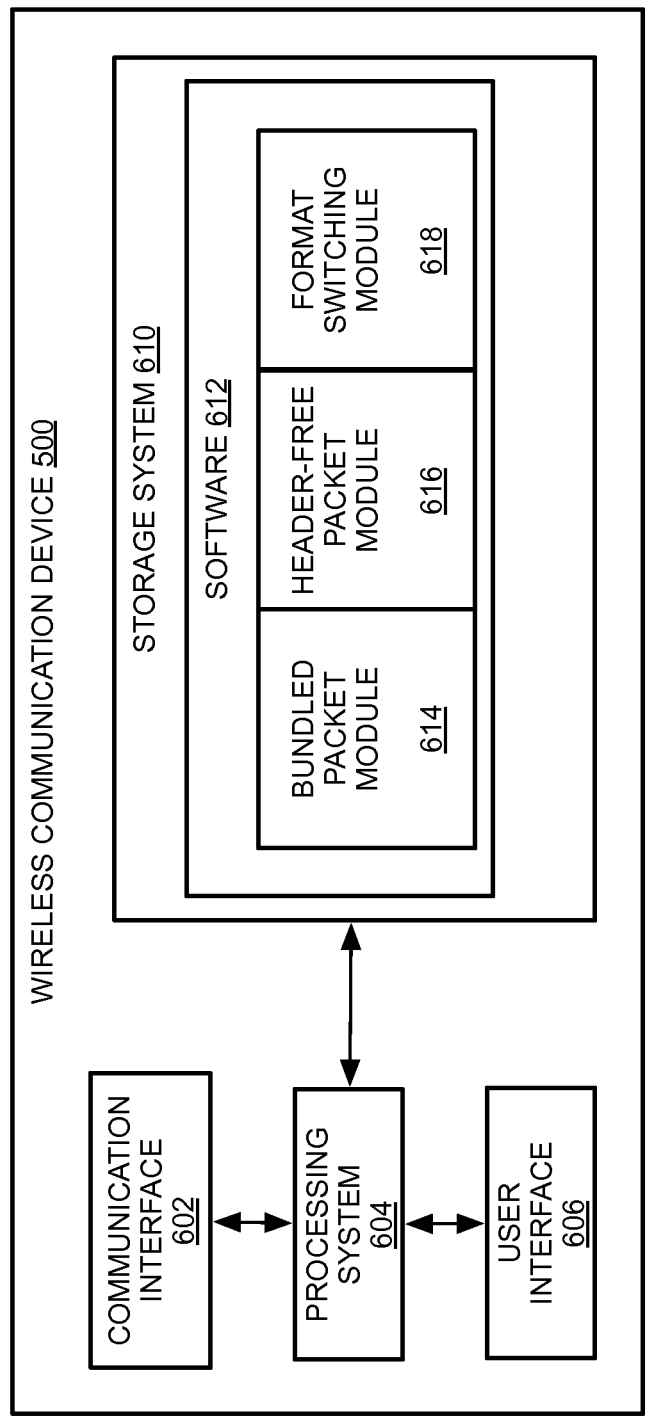
FIG. 5 illustrates a wireless communication device.

FIG. 5 illustrates a wireless communication device 500 that is capable of receiving RTP streams in both Bundled Packet Format and Header-Free Packet Format. Wireless communication device 500 is an example of user communication device 110 and 310 although these devices may use alternate configurations and operations. Wireless communication device 500 includes processing system 505, storage system 510, software 512, communication interface 502, and user interface 506. Processing system 504 loads and executes software 512 from storage system 510. Software 512 includes Bundled Packet module 514, Header-Free Packet module 516, and format switching module 518. Software 512 may further include an operating system, utilities, drivers, network interfaces, applications, or some other type of software. When executed by wireless communication device 500, software modules 514-518 direct processing system 504 to operate as a user communication device as described herein.

In particular, in at least one example, wireless communication device 500 uses communication interface 502 to communicate with an RTP server to indicate wireless communication device 500 can receive a RTP stream using both Bundled Packet Format and Header-Free Packet Format. User communication interface 502 can then receive an RTP stream from the RTP server using both Bundled Packet Format, which will be processed by Bundled Packet module 514, and Header-Free Packet Format, which will be processed by Header-Free Packet module 516. In operation, format switching module 518 can be used to detect packet format switching triggering events. In some examples, these triggering events can include indicators in the RTP stream such as an indicator bit.

Although wireless communication device 500 includes three software modules in the present example, it should be understood that any number of modules could provide the same operation.

Additionally, user communication device 500 includes communication interface 502 that can be configured to communicate wirelessly with base stations and receive RTP streams. Communication interface 502 can communicate using Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or any other similar communication format.

Referring still to FIG. 5, processing system 504 can comprise a microprocessor and other circuitry that retrieves and executes software 512 from storage system 510. Processing system 504 can be implemented within a single processing device but can also be distributed across multiple processing devices or sub-systems that cooperate in executing program instructions. Examples of processing system 504 include general-purpose central processing units, application specific processors, and logic devices, as well as any other type of processing device, combinations of processing devices, or variations thereof.

Storage system 510 can comprise any storage media readable by processing system 504, and capable of storing software 512. Storage system 510 can include volatile and non-volatile, removable and non-removable media implemented in any method or technology for storage of information, such as computer readable instructions, data structures, program modules, or other data. Storage system 510 can be implemented as a single storage device but may also be implemented across multiple storage devices or sub-systems. Storage system 510 can comprise additional elements, such as a controller, capable of communicating with processing system 504.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

User interface 506 can include a mouse, a keyboard, a camera, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in user interface 506. The aforementioned user input and output devices are well known in the art and need not be discussed at length here.

Figure 6:
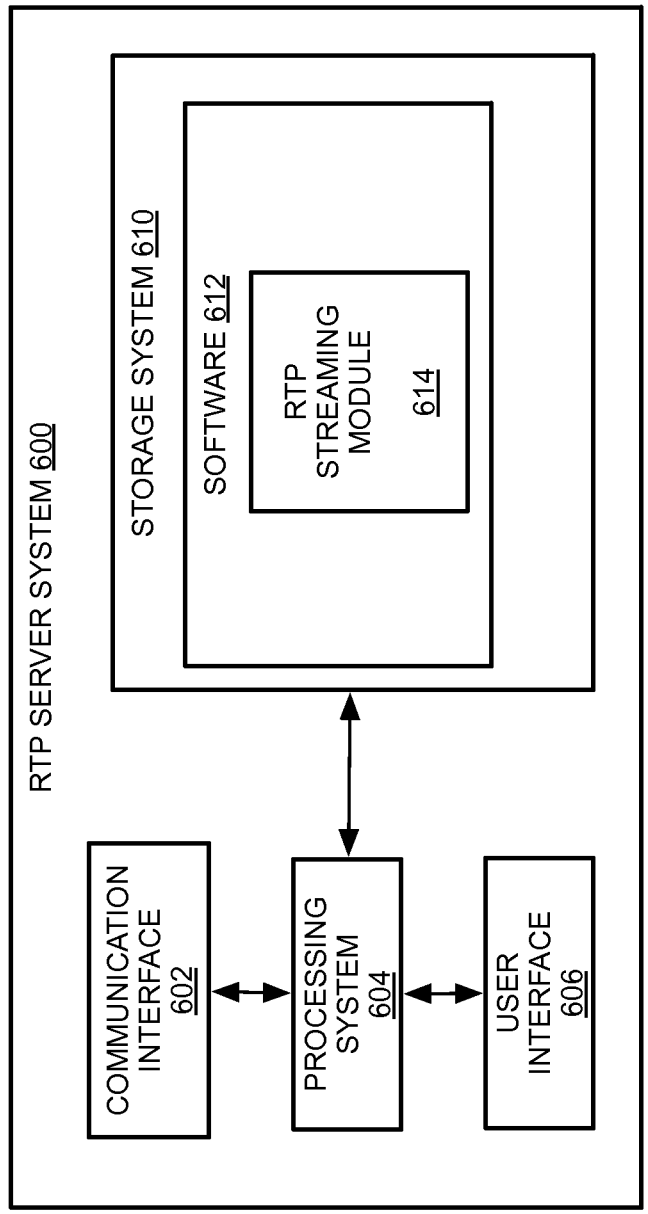
FIG. 6 illustrates a RTP server system.

FIG. 6 illustrates a RTP server system 600 according to one example. RTP server system 600 is an example of RTP server 130 and 350 although these systems may use alternate configurations and operations. RTP server system 600 includes processing system 604, storage system 610, software 612, communication interface 602, and user interface 606. Processing system 604 loads and executes software 612 from storage system 610, including RTP streaming module 614. Software 612 may further include an operating system, utilities, drivers, network interfaces, applications, or some other type of software. When executed by RTP server system 600, RTP streaming module 614 directs processing system 604 to operate an RTP server as further described in FIG. 2 and FIG. 4.

Although RTP server system 600 includes a single software module in the present example, it should be understood that any number of modules could provide the same operation.

Additionally, RTP server system 600 includes communication interface 602 that can be configured to stream using Bundled Packet Format and Header-Free Packet Format. Communication interface 602 can communicate using the Internet or any other form of communication network.

Referring still to FIG. 6, processing system 604 can comprise a microprocessor and other circuitry that retrieves and executes software 612 from storage system 610. Processing system 604 can be implemented within a single processing device but can also be distributed across multiple processing devices or sub-systems that cooperate in executing program instructions. Examples of processing system 604 include general-purpose central processing units, application specific processors, and logic devices, as well as any other type of processing device, combinations of processing devices, or variations thereof.

Storage system 610 can comprise any storage media readable by processing system 604, and capable of storing software 612. Storage system 610 can include volatile and non-volatile, removable and non-removable media implemented in any method or technology for storage of information, such as computer readable instructions, data structures, program modules, or other data. Storage system 610 can be implemented as a single storage device but may also be implemented across multiple storage devices or sub-systems. Storage system 610 can comprise additional elements, such as a controller, capable of communicating with processing system 604.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

User interface 606 can include a mouse, a keyboard, a camera, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in user interface 606. The aforementioned user input and output devices are well known in the art and need not be discussed at length here. In some examples, user interface 606 can be omitted.

It should be understood that although RTP server system 600 is illustrated as one system, the system can comprise one or more systems.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a RTP server, the method comprising:
    receiving a session request from a user communication device indicating the user communication device has packet format switching capability;
    in response to the session request, transferring an acknowledgement to the user communication device wherein the acknowledgement comprises at least a header-free packet string length;
    transferring a RTP stream using bundled packet format;
    transferring a packet format switch triggering event; and
    upon transferring the packet format switch triggering event, transferring the RTP stream using header-free packet format for at least as long as the header-free packet string length.

2. The method of claim 1 wherein the packet format switch triggering event comprises a packet format switching bit.

3. The method of claim 2 wherein the packet format switching bit is included in the bundled packet format, but is not included in the header-free packet format.

4. The method of claim 1 wherein the user communication device comprises a wireless communication device.

5. The method of claim 1 wherein the header-free packet string length is at least fifty packets in length.

6. The method of claim 1 wherein the packet format switching capability comprises an ability to switch between bundled packet format and header-free packet format.

7. The method of claim 1 further comprising:
    upon transferring the RTP stream in header-free packet format for as long as the header-free packet string length, transferring the RTP stream in bundled packet format.

8. The method of claim 1 wherein transferring the packet format switch triggering event occurs in response to a need for maximum bandwidth efficiency and low latency.

9. The method of claim 1 wherein transferring the packet format switch triggering event occurs in response to a type of application running on the user communication device.

10. A non-transitory computer readable medium having program instruction stored thereon that, when executed by a computing system, direct the computing system to at least:
    receive a session request from a user communication device indicating the user communication device has packet format switching capability;
    in response to the session request, transfer an acknowledgement to the user communication device wherein the acknowledgement comprises at least a header-free packet string length;
    transfer a RTP stream using bundled packet format;
    transfer a packet format switch triggering event; and
    upon transferring the packet format switch triggering event, transfer the RTP stream using header-free packet format for at least as long as the header-free packet string length.

11. The non-transitory computer readable medium of claim 10 wherein the program instructions, to transfer the packet format switch triggering event, direct the computing system to transfer a packet format switching bit.

12. The non-transitory computer readable medium of claim 11 wherein the packet format switching bit is included in the bundled packet format, but is not included in the header-free packet format.

13. The non-transitory computer readable medium of claim 10 wherein the user communication device comprises a wireless communication device.

14. The non-transitory computer readable medium of claim 10 wherein the header-free packet string length is at least fifty packets in length.

15. The non-transitory computer readable medium of claim 10 wherein the packet format switching capability comprises an ability to switch between bundled packet format and header-free packet format.

16. The non-transitory computer readable medium of claim 10 wherein the program instructions further direct the computing system upon transferring the RTP stream in header-free packet format for as long as the header-free packet string length, to transfer the RTP stream in bundled packet format.

17. The non-transitory computer readable medium of claim 10 wherein the program instructions, to transfer the packet format switch triggering event, direct the computing system to transfer the packet format switch triggering event in response to a need for maximum bandwidth efficiency and low latency.

18. The non-transitory computer readable medium of claim 10 wherein the program instructions, to transfer the packet format switch triggering event, direct the computing system to transfer the packet format switch triggering event in response to a type of application running on the user communication device.

19. A RTP server system, comprising:
    a communication interface configured to receive a session request from a user communication device;
    a processing system configured to determine whether the session request indicates that the user communication device has packet format switching capability;
    if the user communication device has packet format switching capability, the communication interface configured to:
        transfer an acknowledgement to the user communication device wherein the acknowledgement comprises at least a header-free packet string length;
        transfer a RTP stream using bundled packet format;
        transfer a packet format switch triggering event; and
        upon transferring the packet format switch triggering event, transferring the RTP stream using header-free packet format for at least as long as the header-free packet string length.

20. The system of claim 19, wherein the packet format switch triggering event comprises a packet format switching bit.

* * * * *